United States Patent
Asao et al.

(10) Patent No.: US 7,268,441 B2
(45) Date of Patent: Sep. 11, 2007

(54) CONTROL DEVICE FOR MOTOR GENERATOR

(75) Inventors: Yoshihito Asao, Tokyo (JP); Shinji Nishimura, Tokyo (JP)

(73) Assignee: Mitsubishi Denki Kabushiki Kaisha, Tokyo (JP)

(\*) Notice: Subject to any disclaimer, the term of this patent is extended or adjusted under 35 U.S.C. 154(b) by 0 days.

(21) Appl. No.: 10/554,100

(22) PCT Filed: Feb. 14, 2005

(86) PCT No.: PCT/JP2005/002169

§ 371 (c)(1),
(2), (4) Date: Oct. 21, 2005

(87) PCT Pub. No.: WO2005/078912

PCT Pub. Date: Aug. 25, 2005

(65) Prior Publication Data

US 2006/0214426 A1  Sep. 28, 2006

(30) Foreign Application Priority Data

Feb. 18, 2004  (JP) .......................... 2004-041470

(51) Int. Cl.
*F02N 11/04* (2006.01)
*H02K 23/52* (2006.01)
*H02K 21/00* (2006.01)
*H02P 9/04* (2006.01)
*H02P 1/18* (2006.01)

(52) U.S. Cl. ........................................ 290/31; 318/254

(58) Field of Classification Search ................. 290/31; 318/254, 801
See application file for complete search history.

(56) References Cited

U.S. PATENT DOCUMENTS

| | | | | | |
|---|---|---|---|---|---|
| 2,213,945 | A | * | 9/1940 | Alexanderson | ............... 307/21 |
| 2,492,527 | A | * | 12/1949 | Haas | ........................... 388/844 |
| 3,938,013 | A | * | 2/1976 | Seilly et al. | ................... 318/92 |
| 4,054,821 | A | * | 10/1977 | Williamson | ................. 318/375 |
| 4,330,742 | A | * | 5/1982 | Reimers | ....................... 320/128 |

(Continued)

FOREIGN PATENT DOCUMENTS

JP  9-93828 A  4/1997

(Continued)

Primary Examiner—Julio Gonzalez
Assistant Examiner—Pedro J. Cuevas
(74) Attorney, Agent, or Firm—Sughrue Mion, PLLC

(57) ABSTRACT

In the control device for motor generator in which an engine is started and power generation is performed while a vehicle is running, a field current limit value Ifm in electric driving to start the engine is larger than a field current limit value Ifg in power generation. In the power generation, an inverter mode in a low rotation speed zone for boosting and an alternator mode in a high rotation speed zone for rectifying and outputting a generated voltage without boosting are provided. A field current limit value Ifgi in the inverter-mode power generation and a field current limit value Ifga in the alternator-mode power generation are set differently from each other, and the larger value is set as the value Ifg.

13 Claims, 10 Drawing Sheets

U.S. PATENT DOCUMENTS

| | | | | |
|---|---|---|---|---|
| 4,616,166 A * | 10/1986 | Cooper et al. | | 318/712 |
| 5,512,811 A * | 4/1996 | Latos et al. | | 322/10 |
| 5,587,647 A * | 12/1996 | Bansal et al. | | 322/45 |
| 5,594,322 A * | 1/1997 | Rozman et al. | | 322/10 |
| 5,646,599 A * | 7/1997 | Adachi | | 340/648 |
| 5,747,971 A * | 5/1998 | Rozman et al. | | 322/10 |
| 5,920,162 A * | 7/1999 | Hanson et al. | | 318/254 |
| 6,232,691 B1 * | 5/2001 | Anderson | | 310/179 |
| 6,384,551 B1 * | 5/2002 | Watanabe | | 318/139 |
| 6,388,416 B1 * | 5/2002 | Nakatani et al. | | 318/700 |
| 6,462,429 B1 * | 10/2002 | Dhyanchand et al. | | 290/31 |
| 6,713,888 B2 * | 3/2004 | Kajiura | | 290/40 F |
| 6,771,040 B2 * | 8/2004 | Kusumoto et al. | | 318/801 |
| 6,809,496 B2 * | 10/2004 | Anghel et al. | | 318/700 |
| 6,819,012 B1 * | 11/2004 | Gabrys | | 307/68 |
| 6,903,477 B2 * | 6/2005 | Kusase et al. | | 310/180 |
| 6,938,713 B1 * | 9/2005 | Tahara et al. | | 180/65.3 |
| 6,977,475 B2 * | 12/2005 | Kuribayashi et al. | | 318/140 |
| 6,992,448 B2 * | 1/2006 | Fujimoto et al. | | 318/254 |
| 6,998,726 B2 * | 2/2006 | Sarlioglu et al. | | 290/31 |
| 7,064,513 B2 * | 6/2006 | Fenley | | 318/700 |
| 7,100,719 B2 * | 9/2006 | Yamaguchi | | 180/65.1 |
| 7,119,513 B2 * | 10/2006 | Ishikawa | | 318/801 |
| 2002/0024221 A1 * | 2/2002 | Grewe et al. | | 290/40 C |
| 2002/0074803 A1 * | 6/2002 | Kajiura | | 290/40 F |
| 2003/0030409 A1 * | 2/2003 | Kusumoto et al. | | 318/801 |
| 2003/0127931 A1 * | 7/2003 | Kusase et al. | | 310/184 |
| 2003/0141854 A1 | 7/2003 | Kuribayashi et al. | | 322/28 |
| 2003/0222513 A1 * | 12/2003 | Kuribayashi | | 310/19 |
| 2004/0124796 A1 * | 7/2004 | Bailey et al. | | 318/254 |
| 2004/0163862 A1 * | 8/2004 | Yamaguchi | | 180/65.2 |
| 2006/0076171 A1 * | 4/2006 | Donnelly et al. | | 180/65.2 |
| 2006/0152180 A1 * | 7/2006 | Tahara et al. | | 318/139 |
| 2006/0267344 A1 * | 11/2006 | Kuribayashi et al. | | 290/31 |

FOREIGN PATENT DOCUMENTS

| | | |
|---|---|---|
| JP | 2002-191195 A | 7/2002 |
| JP | 2002-530040 A | 9/2002 |
| JP | 2003-225000 A | 8/2003 |
| JP | 2005237084 A * | 9/2005 |
| WO | WO 01/45250 A1 | 6/2001 |

* cited by examiner

CONTROL DEVICE FOR MOTOR GENERATOR

TECHNICAL FIELD

This invention relates to a control device for motor generator used for starting and power generation of an engine (internal combustion engine) and particularly to control of a field current flowing through a field winding.

BACKGROUND ART

In Patent Reference 1, it is disclosed that the maximum values of field current in electric driving and in power generation are set at different values.
Patent Reference 1: JP-A-2002-191195
Patent Reference 2: JP-T-2002-530040

DISCLOSURE OF THE INVENTION

Problems that the Invention is to Solve

In Patent Reference 1, a field current in power generation must be determined from many parameters including the temperature of a rotor in power generation, the field current in motor driving, field resistance, starting time, heat capacity of the rotor and the like. For example, the heat capacity of the rotor is necessarily determined if the motor generator is decided. However, the starting time or the like varies during the operation, because of the state of the engine such as the temperature of a cylinder, the initial position of each crank and the like, and it is impossible to determine the starting time or the like in advance. Therefore, it is impossible to determine the maximum value of the field current in advance.

In order to solve the problems as described above, it is an object of this invention to provide a control device for motor generator that easily sets a limit value of field current.

Means for Solving the Problems

A control device for motor generator according to this invention includes a motor generator having a stator with an armature winding wound thereon and a rotor of claw-pole shape with a field winding wound thereon, an inverter unit that sends and receives electric power to and from the armature winding, a field circuit that controls a field current flowing through the field winding, and a control circuit that controls the inverter unit and the field circuit, wherein an engine is started and power generation is performed while a vehicle is running. A field current limit value Ifm in electric driving to start the engine is larger than a field current limit value Ifg in power generation. In the power generation, an inverter mode in a low rotation speed zone for boosting and an alternator mode in a high rotation speed zone for rectifying and outputting a generated voltage without boosting are provided. A field current limit value Ifgi in the inverter-mode power generation and a field current limit value Ifga in the alternator-mode power generation are set differently from each other, and the larger value is set as the value Ifg.

ADVANTAGES OF THE INVENTION

According to the control device for motor generator of this invention, it is possible to design a control device for motor generator that can maintain quality in both zones simply by deciding the field current limit value in one of the zones in the power generation. Also, as different field current limit values are set in the low rotation speed zone and the high rotation speed zone in the power generation, the degree of freedom in design can be increased. Since Ifg in the power generation at a high temperature is made smaller than Ifm in the electric driving, continuous operation is safely performed.

BEST MODE FOR CARRYING OUT THE INVENTION

Embodiment 1

FIG. 1 is a conceptual view showing a control device for motor generator according to Embodiment 1 of this invention. In FIG. 1, a motor generator 20 is a belt-driven motor generator and has an armature winding 21 of a stator and a field winding 4 of a rotor. The rotor is connected with a rotary shaft of an engine 1 by a belt (not shown). Here, the armature winding 21 is formed by delta-connecting three-phase coils. An inverter unit 22 has an inverter module 23 including plural switching elements 8 and diodes 9 connected parallel to the individual switching elements 8, and a capacitor 7 connected parallel to the inverter module 23. This capacitor 7 plays the role of smoothing a current flowing through the inverter module 23.

The inverter module 23 is formed by connecting, in series, two sets of switching element 8 and diode 9 connected parallel to each other, then arranging three such series connections in parallel, and integrally sealing these elements 8 and 9 in a package. Then, each delta connection end of the armature winding 21 is connected to the mid point of the switching element 8 connected in series. 13 represents a field circuit that controls a field current of the field winding 4. In the inverter module 23, the switching operation of the switching elements 8 is controlled by a control circuit 10. A field current of the field circuit 13 is controlled by the control circuit 10. A rotation signal 12 is fed to the control circuit 10. The motor generator 20 is supplied with power from a battery 11 via the inverter unit 22 and thus operates as a starting motor to start the engine 1. After the engine 1 is started, the motor generator 20 is rotationally driven by the engine 1 and operates as an AC generator. It generates a three-phase alternating voltage, which is stored into the battery 11 via the inverter unit 22.

Next, the operation of the control device for motor generator will be described. The control circuit 10 performs on/off control of each switching element 8 and generates three-phase AC power from DC power of the battery 11. This three-phase AC power is supplied to the armature winding 21 of the motor generator 20 and a rotating magnetic field is provided to the field winding 4 of the rotor, thus rotationally driving the rotor. Then, the rotating force of the rotor is transmitted to the engine 1 via a pulley and a belt, and the engine 1 is rotationally driven and started. As the engine 1 is started, the rotating force of the engine 1 is transmitted to the motor generator 20 via the belt and the pulley.

The rotor is thus rotationally driven and a three-phase alternating voltage is induced in the armature winding 21. The control circuit 10 monitors the rotation speed of the rotor on the basis of the rotation signal 12 from the motor generator 20. When the rotation speed is less than a predetermined speed (for example, 2000 r/min) (in the low rotation speed zone), each switching element 8 is on/off-controlled and the motor generator 20 is caused to generate power in an inverter mode (mode for boosting). In the inverter mode in this low rotation speed zone, each switching element 8 of the inverter module 23 is on/off-controlled to boost the voltage.

When the rotation speed is equal to or higher than a predetermined speed (for example, 2000 r/min) (in the high rotation speed zone), each switching element 8 is turned off and the motor generator 20 is caused to generate power in an alternator mode (mode for rectifying and outputting a generated voltage without boosting). Thus, the inverter module 23 becomes a three-phase full-wave rectifier in which three sets connected in parallel, with each set including two diodes 9 connected in series. The three-phase alternating voltage induced in the armature winding 21 is rectified to a direct current by the inverter unit 22. The battery 11 is charged with the rectified DC power.

FIG. 2 is a structural sectional view of the control device for motor generator according to Embodiment 1. In the drawings, the same numeral represents the same or equivalent part. The motor generator 20 has a rotor 40 of claw-pole shape that is fixed to a shaft 41 and rotatably mounted on a front bracket 43 and a rear bracket 44, a stator 42 that is held between the lateral end parts of the front bracket 43 and the rear bracket 44 and arranged to surround the rotor 40, a fan 45 fixed to both end surfaces in the axial direction of the rotor 40, a pulley 46 fixed to the end part on the front side of the shaft 41, a brush holder 47 arranged on the inner wall surface of the rear bracket 44 so as to be situated on the outer circumference of the rear side of the shaft 41, and a pair of brushes 48 arranged within the brush holder 47 so as to slide in contact with a pair of slip rings 49 mounted on the rear side of the shaft 41.

This motor generator 20 is connected to the engine 1 via the pulley 46 and a belt (not shown). Also, air intake holes 43a, 44a are opened in the end surfaces of the front bracket 43 and the rear bracket 44, and air outlet holes 43b, 44b are opened in the lateral surfaces of the front bracket 43 and the rear bracket 44. The field winding 4 is wound on the rotor core of the rotor 40. The armature winding 21 is wound on the stator 42.

The inverter unit 22 has a heat sink 30 designed for radiation to have a sufficient heat capacity to accommodate heat loss quantity due to heat generation from the switching elements 8, a resin-molded part 31 formed by integrally molding an insulating resin with the outer circumferential part of the heat sink 30, a control circuit board 32 on which electronic components for on/off control of the switching elements 8 are mounted, and a power-supply terminal 33. A space for housing the control circuit board 32 therein is sealed with a lid 35.

In such a configuration, when the rotor 40 is rotationally driven, the fan 45 is driven. Thus, cooling air is fed into the front and rear brackets 43, 44 from the air intake holes 43a, 44a, and a flow of cooling air curved by the fan 45 in the centrifugal direction and emitted from the air outlet holes 43b, 44b is formed. This cooling air cools the armature winding 21. In this case, the cooling air flows along the heat sink 30, and the heat generated in the switching elements 8 and the diodes 9 is radiated by the cooling air.

FIG. 3 is a block diagram showing field current control in the control device for motor generator according to Embodiment 1. The part within the frame indicated by a broken line is included in the control circuit 10. The field circuit 13 has the field winding 4, a transistor 14 that is on/off-controlled, and a fly wheel diode 15, and adjusts the field current of the field winding 4 to a desired value. A field current measured by a field current sensor 16 is outputted to a subtractor 17. A field current limiter 18 outputs a field current instruction value corresponding to a power generation mode (which will be described later) or a starting mode to the subtractor 17. The subtractor 17 finds the difference between the field current instruction value and the field current measured by the field current sensor 16. A duty control circuit 19 performs on/off control of the transistor 14 by duty control corresponding to the difference and the integral value of the difference. The field current of the field winding 4 thus has the field current instruction value corresponding to the power generation mode or the starting mode.

Next, the limit value of the field current flowing through the field winding 4 will be described. When starting the engine, for the field current, a maximum current determined from the power-supply voltage, field resistance, wiring resistance, voltage drop of the switching elements, voltage drop due to brush contact and the like, or a current value that can be lowered by the temperature at the time of use, deterioration and the like, is determined in advance as a maximum field current at the time of starting, and this maximum field current is flowed.

Simultaneously with or slightly after the field current is flowed in the starting mode, or when the field current is stabilized, the armature current is flowed to start the engine. In this case, as a current that offsets a magnetic flux in the same direction as the field magnetic flux, that is, a direct-axis current Id (<0) of the armature, is flowed, large starting torque can be acquired even when the field magnetic flux is largely saturated.

However, since the field current is limited by the power-supply voltage, field winding resistance, increase in field winding resistance due to temperature rise, wiring resistance and the like, the wire of the field winding must be made thicker in order to acquire a desired field current under the worst conditions. Therefore, the contact area of the field windings is decreased and heat transfer of the field winding is lowered. The cooling property of the field winding is lower than in a generator where starting of an engine is not carried out.

If the field current is reduced as the number of rotations of the engine increases, relatively large driving torque can be acquired even at a high rotation speed. Also, in starting, when the maximum torque that can be achieved by the motor at that rotation speed is not necessarily required, the absolute value of Id can be reduced by further reducing the field current. Therefore, copper loss and field loss can be reduced and efficient starting can be realized.

After the starting of the engine is detected from the rotation speed, an ignition signal of the engine or the like, the motor generator starts generating power in accordance with the need. It does not suffice that the field current in the power generation is flowed for a very short time as in the starting. Therefore, the field current in the power generation must be limited to a smaller value than the field current limit value Ifm in the starting.

In the low rotation speed zone where the rotation speed of the engine is low, the electromotive force of the motor generator is small and therefore the battery cannot be charged simply by rectifying the electromotive force. Thus, by on/off-controlling the switching elements of the inverter and flowing a negative q-axis current (current that forms a magnetic flux orthogonal to the field magnetic flux), it becomes possible to boost the voltage and to perform the inverter-mode power generation. In short, in the low rotation speed zone, the control circuit 10 performs on/off control of each switching element 8 of the inverter unit 22 in accordance with the rotation signal 12, and causes the motor generator 20 to generate power in the inverter mode (mode for boosting). However, since the rotation speed is low, and because of the magnetic pole of the claw pole and the small quantity of cooling air from the cooling fan, power generation is performed with a relatively small field current.

When the rotation speed of the engine increases (entering the high rotation speed zone), the electromotive force increases and therefore power generation is possible without forcing the q-axis current to flow by the inverter. In this case, the inverter is used only for rectifying the alternating current. In short, in the high rotation speed zone, the control circuit 10 turns off each switching element 8 of the inverter unit 22 in accordance with the rotation signal 12 and causes the motor generator 20 to generate power in the alternator mode (mode for rectifying and outputting the generated voltage without boosting).

In the high rotation speed zone, since the cooling efficiency is high because of the magnetic pole of the claw pole and the large quantity of cooling air from the cooling fan, it is possible to flow a relatively large field current and thus to perform power generation with large current. However, if it becomes excessive, again, the rise in the temperature causes deterioration in insulation. Therefore, a field current limit value Ifga is provided. A field current limit value that is larger than the field current limit value Ifgi in the power generation using the inverter mode can be used. Since the field current need not be always used at these limit values and the quantity of power generation is controlled in accordance with the connected electric load, the field current is suitably controlled at or below the limit values.

These field current limit values are determined in advance in the following manner. Specifically, the field current limit values are determined so that the temperature of each part of the motor generator does not exceed the maximum temperature of each part of the motor generator, which is separately defined, when power generation in the maximum quantity is continuously carried out at the highest ambient temperature at which the motor generator may be used. That is, the maximum quantity of power generation and the cooling capability change at each rotation speed, and the field current limit values are determined so that, under these conditions, the temperature of each part of the motor generator does not exceed the maximum temperature of each part of the motor generator, which is separately defined in accordance with the insulating material and the like. Although a field current limit value may be provided for each rotation speed, the control is complicated. Therefore, in accordance with the power generation mode, that is, in accordance with the inverter-mode power generation or the alternator-mode power generation, the field current limit value Ifgi in the inverter-mode power generation and the field current limit value Ifga in the alternator-mode power generation are provided. Thus, the temperature of each part of the motor generator can be maintained at a preset value or lower and a very reliable small-size motor generator can be provided.

FIG. 4 is a graph showing power generation output in the control device for motor generator according to Embodiment 1. The horizontal axis represents the rotation speed (r/min) and the vertical axis represents the output current (A). The maximum output current at the field current limit value Ifgi, Ifga in each mode is shown. The field current limit value in this case is, for example, Ifgi=4 to 10 A and Ifga=4 to 10 A with respect to Ifm=20 A at the time of electric driving to start the engine. The field current limit value Ifga is adjusted to acquire an output current corresponding to the required specifications.

In this invention, in the control device for the motor generator that starts the engine and generates power while the vehicle is running, the field current limit value Ifm in the electric driving to start the engine is larger than the field current limit value Ifg in the power generation. In the power generation, the inverter mode in the low rotation speed zone for boosting and the alternator mode in the high rotation speed zone for rectifying and outputting the generated voltage without boosting are provided. The field current limit value Ifgi in the inverter-mode power generation and the field current limit value Ifga in the alternator-mode power generation are set differently from each other, and the larger value is set as the value Ifg.

Thus, it is possible to design the control device for motor generation that can maintain quality in both zones simply by determining the field current limit value in one of the zones in the power generation. As the different field current limit values are used in the low rotation speed zone and the high rotation speed zone in the power generation, the degree of freedom in design can be increased. Since Ifg in the power generation is smaller than Ifm in the electric driving, continuous power generation can be safely carried out.

Moreover, in this invention, the field current limit value Ifm in the electric driving to start the engine is larger than the field current limit value Ifg in the power generation, and the field current limit value Ifgi in the inverter-mode power generation and the field current limit value Ifga in the alternator-mode power generation are set differently. The field current limit value Ifga in the alternator-mode power generation is set to be equal to or larger than the field current limit value Ifgi in the inverter-mode power generation. As the field current limit value Ifg in the power generation, the field current limit value Ifga in the alternator-mode power generation is set.

Thus, since the shape of the rotor in the claw-pole is a claw-shape, the cooling performance in the high rotation speed zone improves. Therefore, setting Ifg in the high rotation speed zone is desirable in view of the thermal restraint of the motor generator. Moreover, in the low rotation speed zone, since the voltage is boosted by the inverter, the armature current may flow more than the power generated without boosting and the thermal constraint may become very strict. Therefore, it is desirable to reduce the field current in the low rotation speed zone.

Embodiment 2

In the motor generator, the wire diameter of the field winding is larger and the number of turns is smaller than in a generator used only for power generation, in order to increase the field current in starting the engine. Therefore, to achieve equivalent ampere-turn of the field winding to acquire the same quantity of power generation, a large field current must be flowed. The number of turns of the armature winding is smaller than in the generator-based design. However, the field current flows through the wiring, brush, slip rings, field current control transistor (MOSFET) and the like from the power source such as battery. Particularly for the brush, when the current is large and the speed of sliding contact with the slip rings is high, the wear amount increases. As the wear increases, finally, the field current cannot flow through the brush.

Therefore, a control device for motor generator may be desired in which the field current limit value Ifga particularly in the alternator-mode power generation where it is operated in the high rotation speed zone is set to be smaller than the field current limit value Ifgi in the inverter-mode power generation, thereby reducing the wear of the brush and increasing the service life of the motor generator.

In an idle stop system, the engine is usually stopped and the field current does not flow in this case. In the low rotation speed zone where the inverter-mode power generation is carried out, the motor generator is operated at an idle rotation speed for only a short time even if the engine is not stopped. Therefore, the wear of the brush does not particularly increase.

Thus, in Embodiment 2, the field current limit value Ifgi in the inverter-mode power generation is set to be equal to or larger than the field current limit value Ifga in the alternator-mode power generation, and the field current limit value Ifgi in the inverter-mode power generation is set as the field current limit value Ifg in the power generation.

As this setting is done, when Embodiment 2 is used as an idle stop system, the engine is stopped and no power generation is carried out at the time of idling, and the quantity of power generation increases to compensate this. Therefore, if the field current limit value Ifga in the high rotation speed zone where the wear of the brush is large is set to be smaller than the field current limit value Ifgi in the low rotation speed zone, the wear of the brush is reduced and a motor generator of long service life can be provided. In the low rotation speed zone, the motor generator is operated at the idle rotation speed for only a short time even if the engine is not stopped. Therefore, the wear of the brush need not be considered.

Embodiment 3

FIG. 5 is a block diagram showing field current control in a control device for motor generator according to Embodiment 3. A field current instructing unit 28 outputs an optimum field current instruction that does not exceed a limit value corresponding to a power generation quantity instruction and rotation speed with respect to the power generation mode. FIG. 6 is a graph showing the optimum field current to the quantity of power generation at each rotation speed in the control device for motor generator according to Embodiment 3. The rotation speed is 500 to 3000 r/min and the optimum field current to the quantity of power generation is shown by using each speed as a parameter.

FIG. 7 is a graph showing optimum instructions of direct-axis current Id, quadrature-axis current Iq and field current If of an armature with respect to a power generation quantity instruction at a rotation speed of 1000 r/min in the control device for motor generator according to Embodiment 3. FIG. 8 is a graph showing instructions of direct-axis current Id, quadrature-axis current Iq and field current If of an armature with respect to the rotation speed in starting the engine, in the control device for motor generator according to Embodiment 3. FIG. 9 is a graph showing optimum instructions of direct-axis current Id, quadrature-axis current Iq and field current If of an armature with respect to a starting torque instruction at a rotation speed of 650 r/min in the control device for motor generator according to Embodiment 3.

As shown in FIG. 8, in starting the engine, when the rotation speed of the motor generator is low, the maximum field current limited by voltage and current is flowed and the quadrature-axis current Iq and the direct-axis (vertical-axis) current Id are flowed through the armature to start rotation. As the rotation speed increase, the absolute value of the direct-axis current Id, which has a negative value, increases, and the field current is reduced. Thus, high output is acquired even at a high rotation speed. Also, when the torque necessary for starting need not be as high as the maximum torque of this motor generator, the torque instruction value is lowered and the field current is reduced, thereby improving the efficiency.

In the alternator-mode power generation, the adjustment of the quantity of power generation is realized only by controlling the value of the field current. That is, when the DC voltage is high, it is because the quantity of power generation is too large with respect to the load. Therefore, the field current is reduced to decrease the quantity of power generation. On the other hand, when the DC voltage is low, it is because the quantity of power generation is insufficient with respect to the electric load. Therefore, the field current is increased within the limit of the field current to increase the quantity of power generation.

In the inverter-mode power generation, the quantity of power generation can be controlled by the field current or the armature current. The inventor has gathered data of power generation characteristics while varying the rotation speed, terminal voltage, field current, armature current value and armature current phase, and has discovered that, when the quantity of power generation is small, the efficiency is improved more by lowering the field current and controlling the quantity of power generation while changing the armature current value and armature current phase than by reducing the quantity of power generation only by the armature current with a constant field current. According to this discovery, in a certain rotation speed zone or below, there is no zone where the field current should always be maintained at a constant value even when the quantity of power generation is lowered as in Patent Reference 2, and when the quantity of lower generation is lowered, the efficiency is improved by reducing the field current.

In Embodiment 3, the field current limit value at the time of the maximum power generation in the inverter-mode power generation in the low rotation speed zone for boosting is expressed as Ifgi and this Ifgi is a function of the rotation speed. The speed zone is provided in which the field current Ifgip in the case where the quantity of power generation at each rotation speed is smaller than the maximum quantity of power generation at the rotation speed is smaller than Ifgip.

Thus, reducing the field current at the time of partial load enables improvement in efficiency and reduction in electromagnetic noise. When the power generation quantity instruction is small, the field current is reduced and therefore electromagnetic noise decreases. In the rotor having a permanent magnet in the claw pole, since the flux density in the air gap particularly increases, electromagnetic noise is large. However, reducing the field current at the time of low output increases the effect of reducing electromagnetic noise.

The rotor of claw-pole shape has a field-supplementing permanent magnet.

In the case where the permanent magnet is added, the output is large. Therefore, it is possible to reduce electromagnetic noise by reducing the field at the time of low output. Preventing the temperature from rising to a predetermined temperature or higher enables prevention of irreversible demagnetization of the magnet due to the temperature rise.

Embodiment 4

In Embodiment 3, the field current is reduced at the time of low load in a certain rotation speed zone of the low rotation speed zone for boosting. However, in this zone, the field current may be increased to or higher than the field current limit value Ifg in the alternator-mode power generation to stop boosting power generation. In this case, while the field current increases, the armature current decreases, thus improving the efficiency. FIG. 10 is a graph showing power generation output in a control device for motor generator according to Embodiment 4. The horizontal axis represents the rotation speed (r/min) and the vertical axis represents the output current (A). The zone of low load indicated by the hatching is a zone where boosting is not carried out. The field current in this case is equal to or larger than the field current limit value Ifga in the alternator-mode power generation.

INDUSTRIAL APPLICABILITY

This invention is suitably applied to a control device for motor generator that performs field current control used for starting and power generation of an internal combustion engine.

DESCRIPTION OF REFERENCE NUMERALS AND SIGNS

Figure 1:
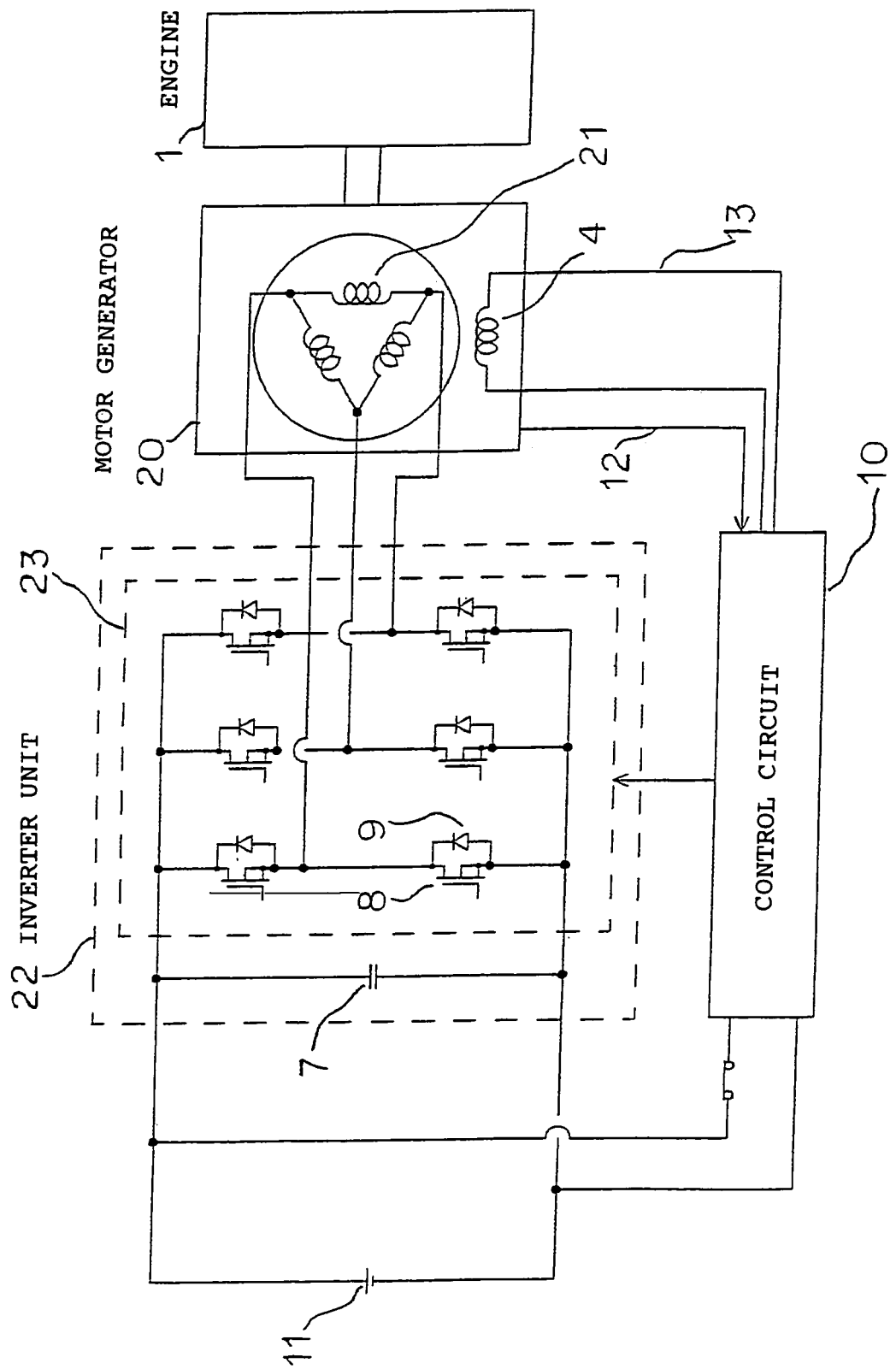
FIG. 1 is a conceptual view showing a control device for motor generator according to Embodiment 1 of this invention.
Figure 2:
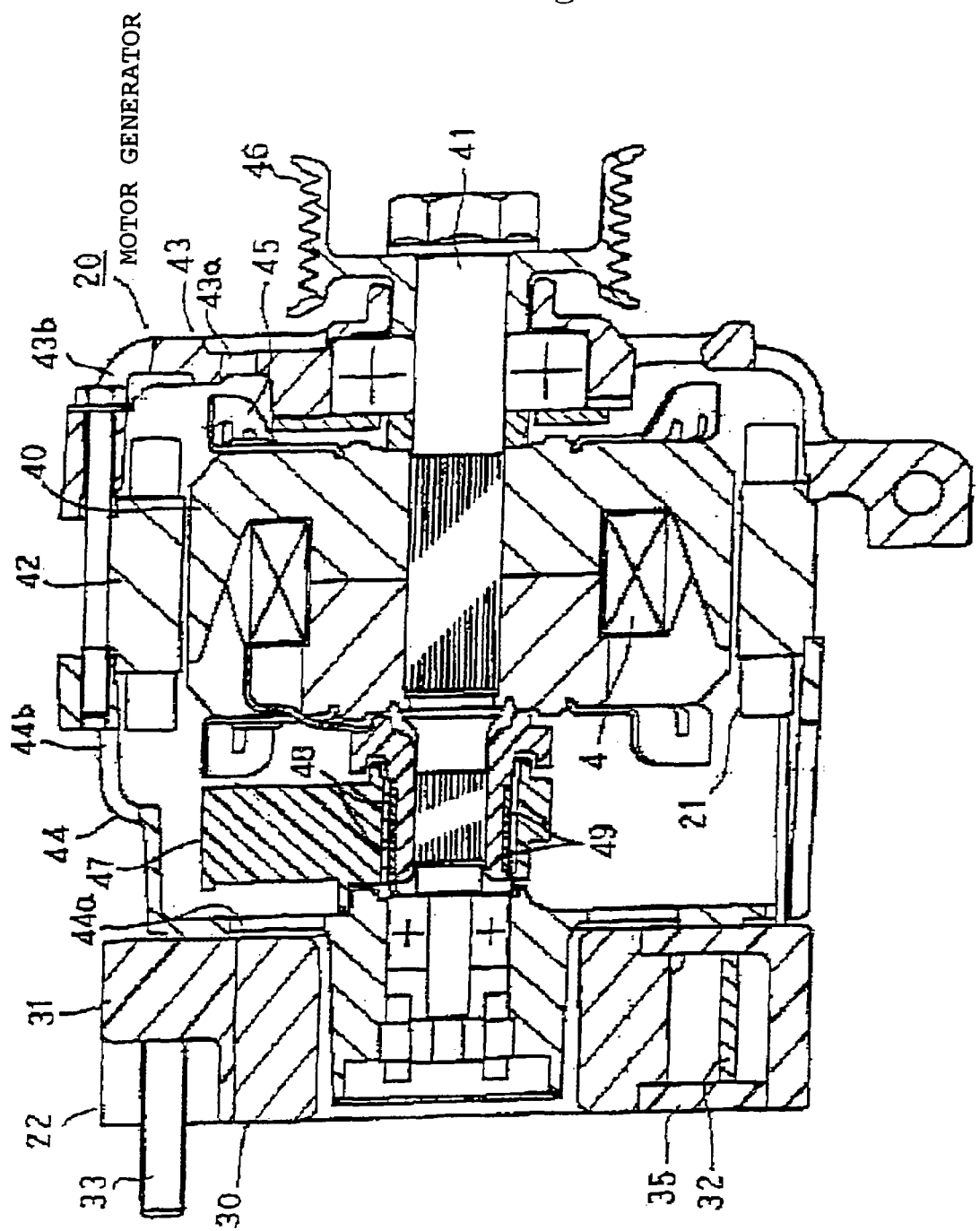
FIG. 2 is a structural sectional view of the control device for motor generator according to Embodiment 1.
Figure 3:
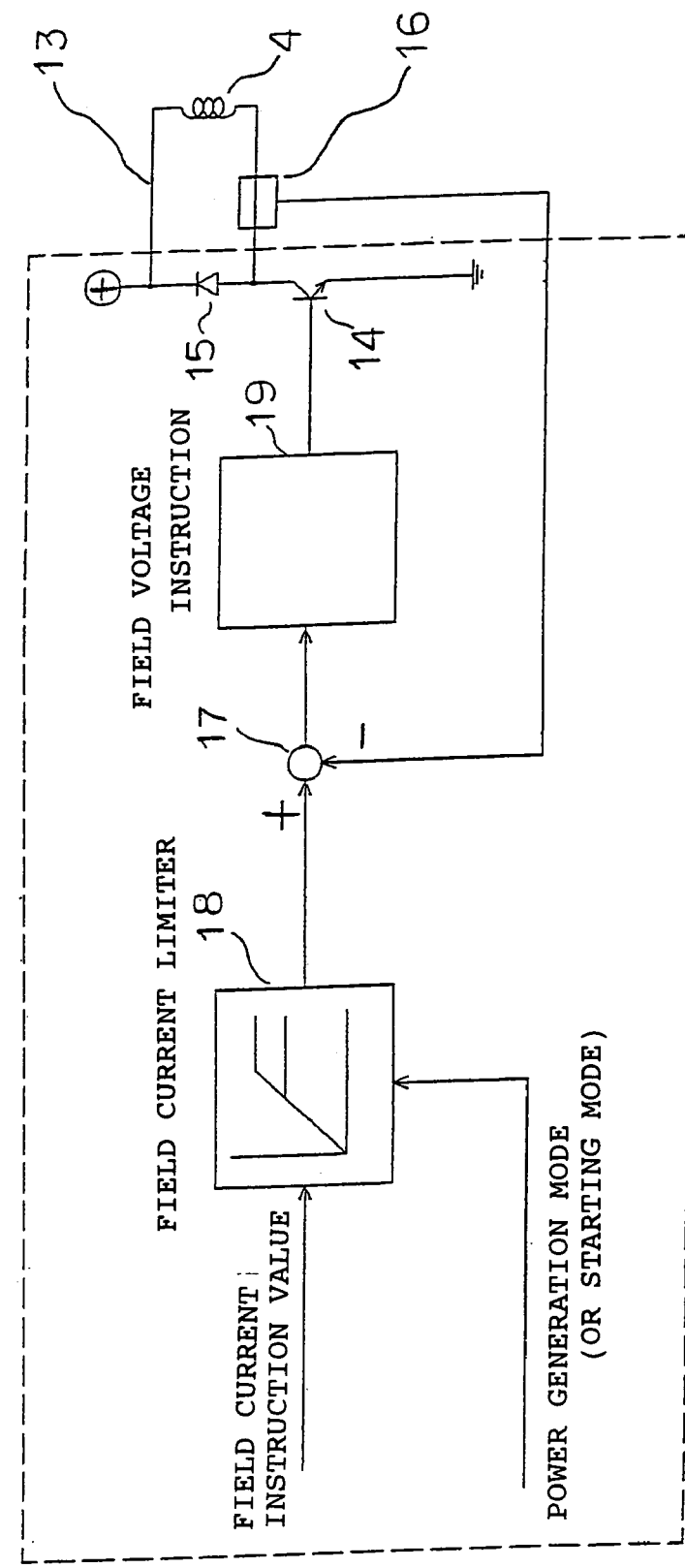
FIG. 3 is a block diagram showing field current control in the control device for motor generator according to Embodiment 1.
Figure 4:
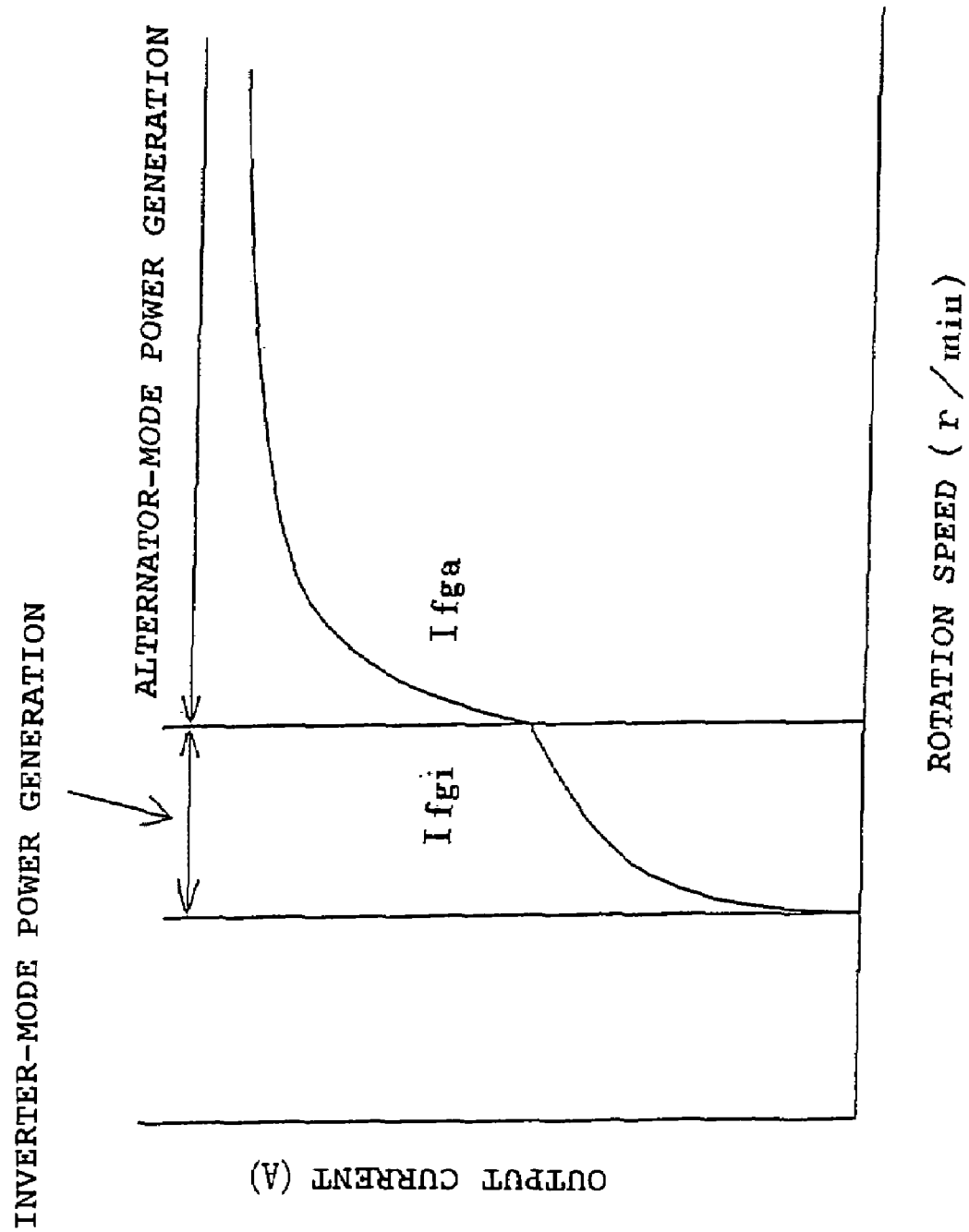
FIG. 4 is a graph showing power generation output in the control device for motor generator according to Embodiment 1.
Figure 5:
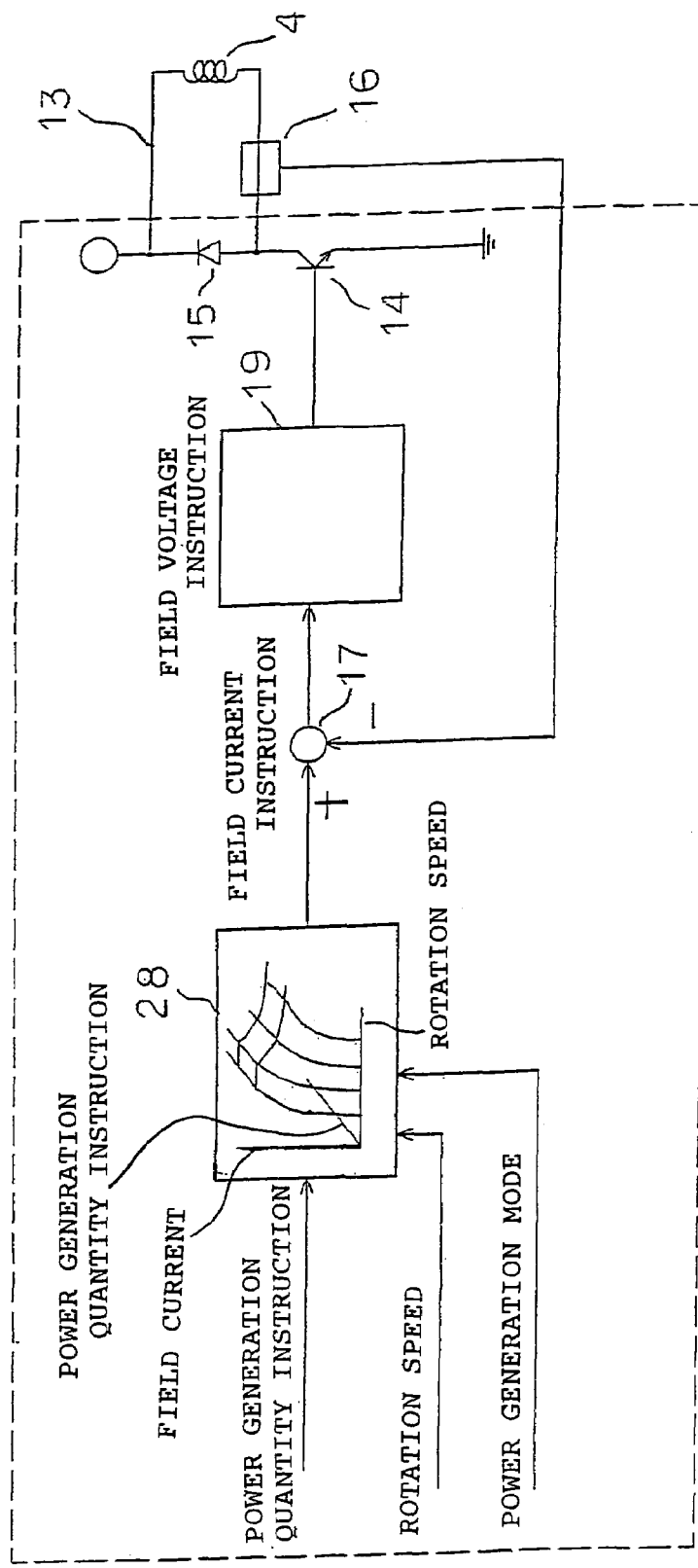
FIG. 5 is a block diagram showing field current control in a control device for motor generator according to Embodiment 3.
Figure 6:
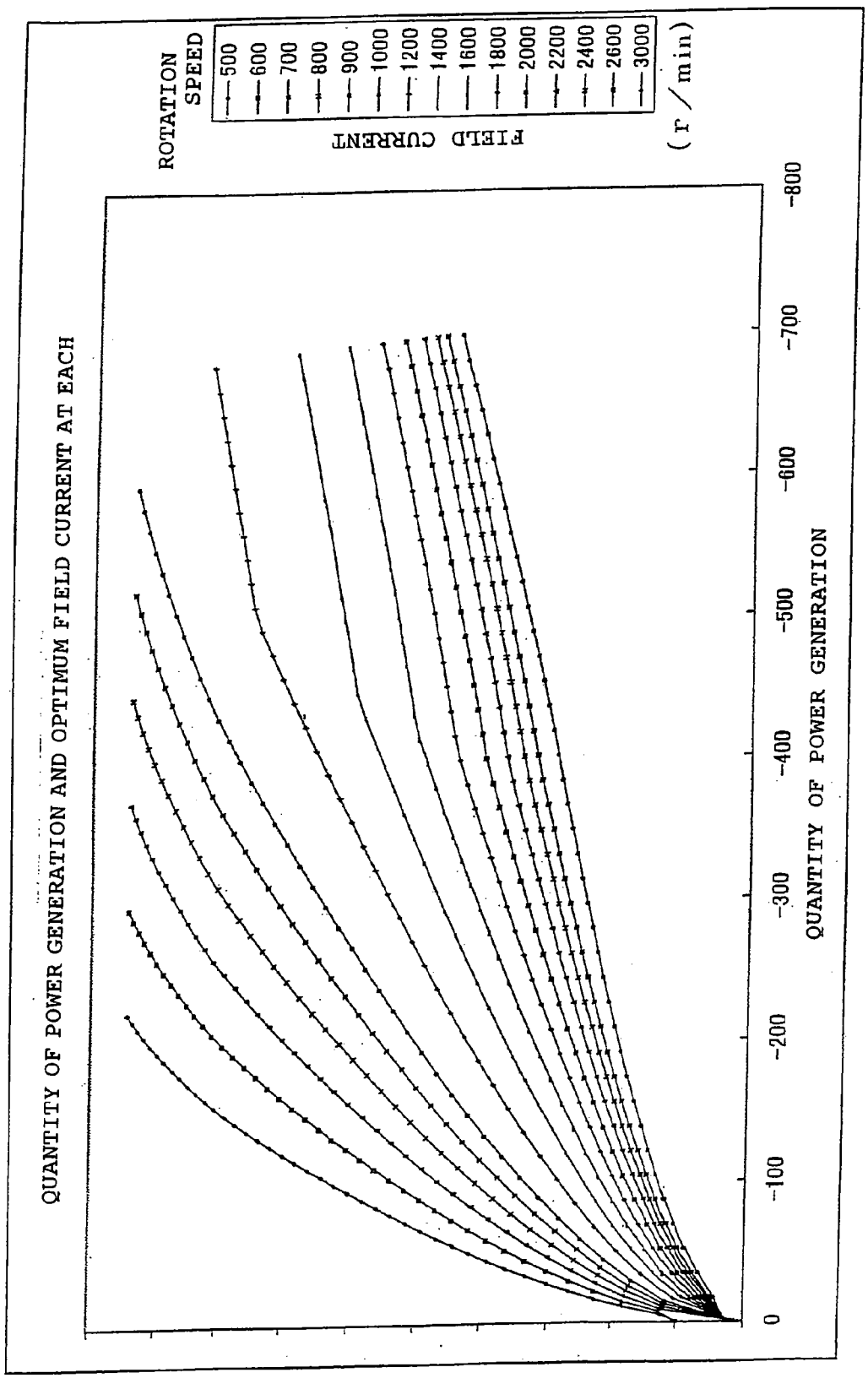
FIG. 6 is a graph showing an optimum field current to the quantity of power generation at each rotation speed in the control device for motor generator according to Embodiment 3.
Figure 7:
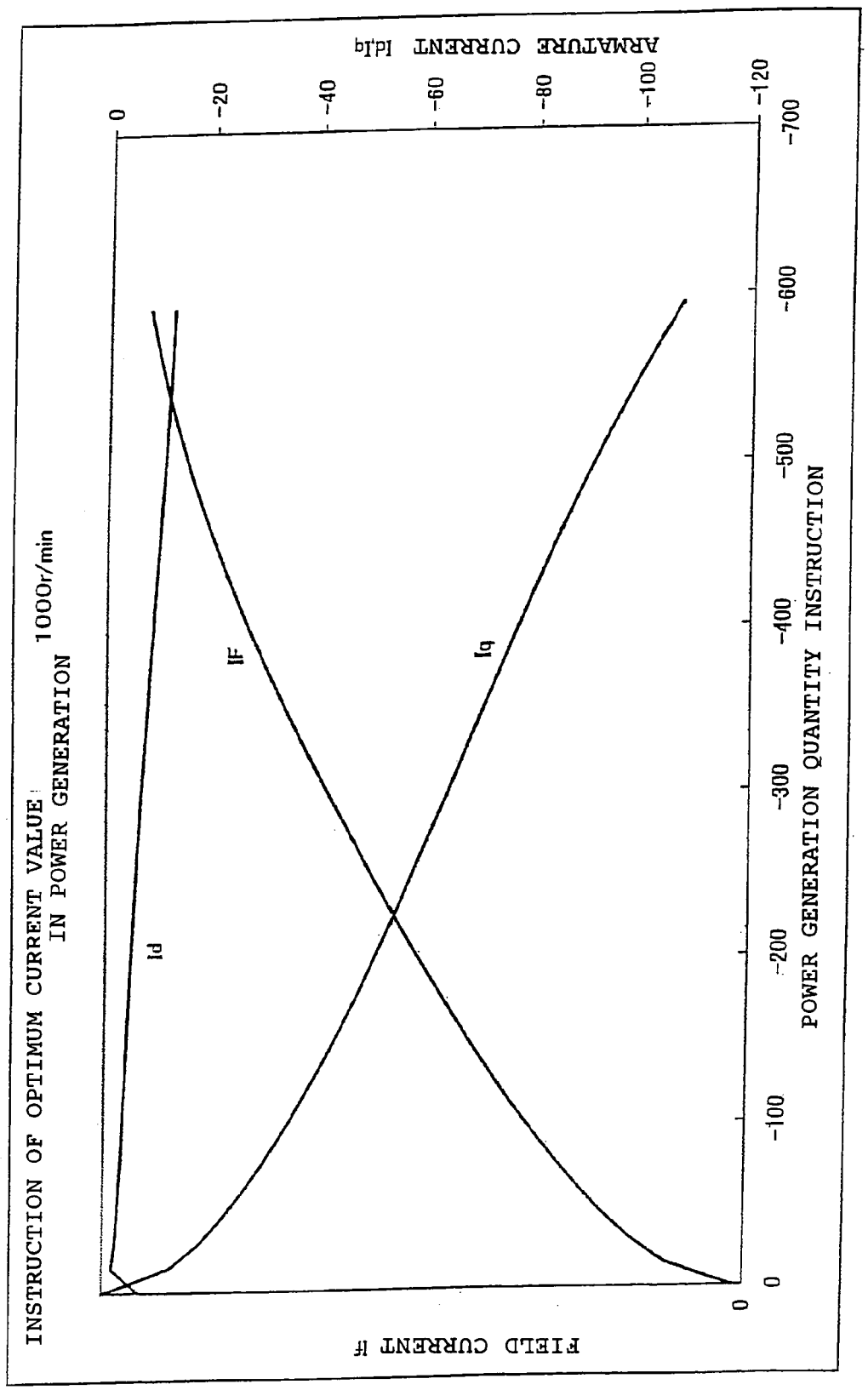
FIG. 7 is a graph showing optimum direct-axis current Id, quadrature-axis current Iq and field current If of an optimum armature with respect to the quantity of power generation at a rotation speed of 1000 r/min in the control deice for motor generator according to Embodiment 3.
Figure 8:
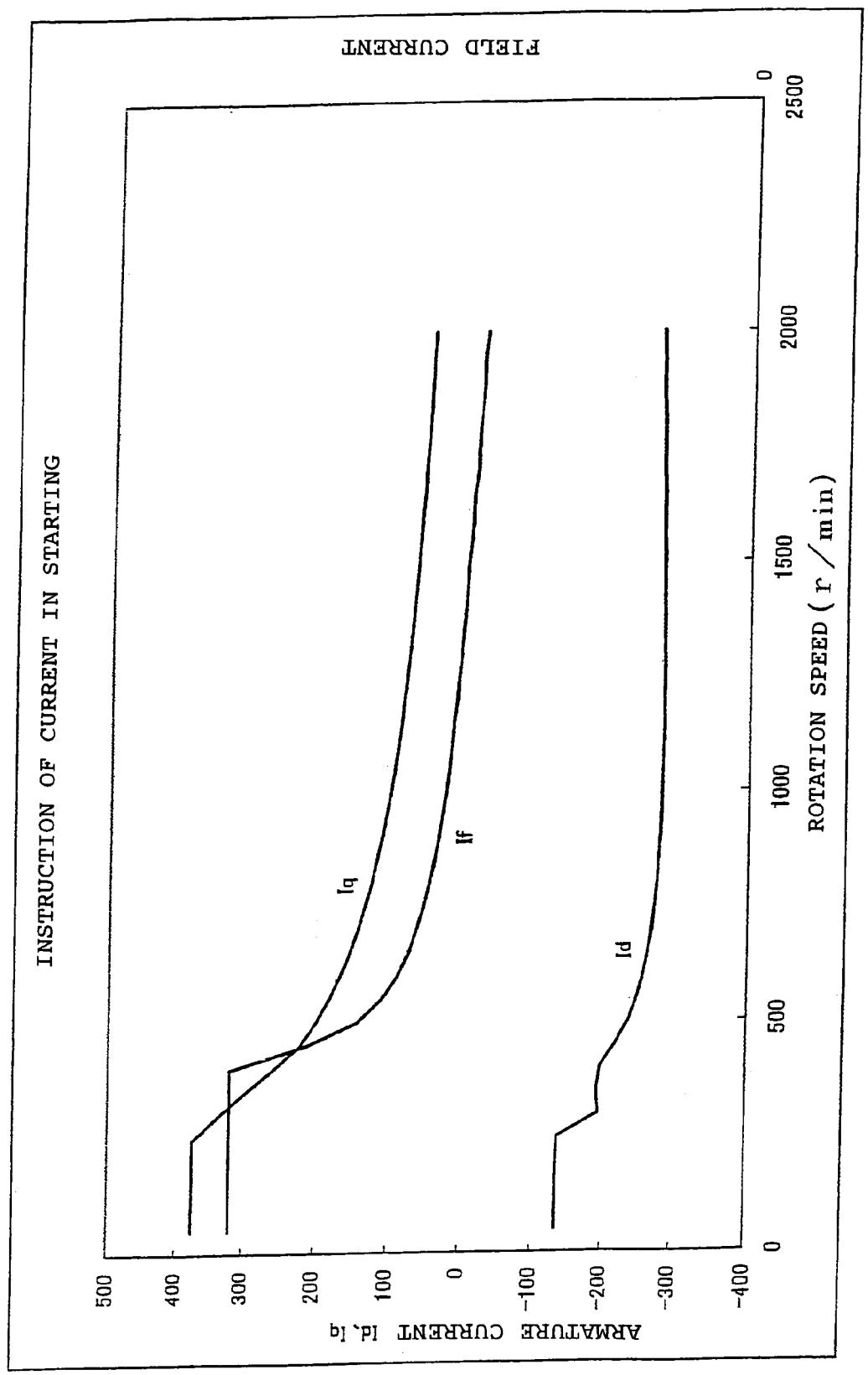
FIG. 8 is a graph showing direct-axis current Id, quadrature-axis current Iq and field current If of an armature with respect to the quantity of power generation at the time of starting the engine in the control deice for motor generator according to Embodiment 3.
Figure 9:
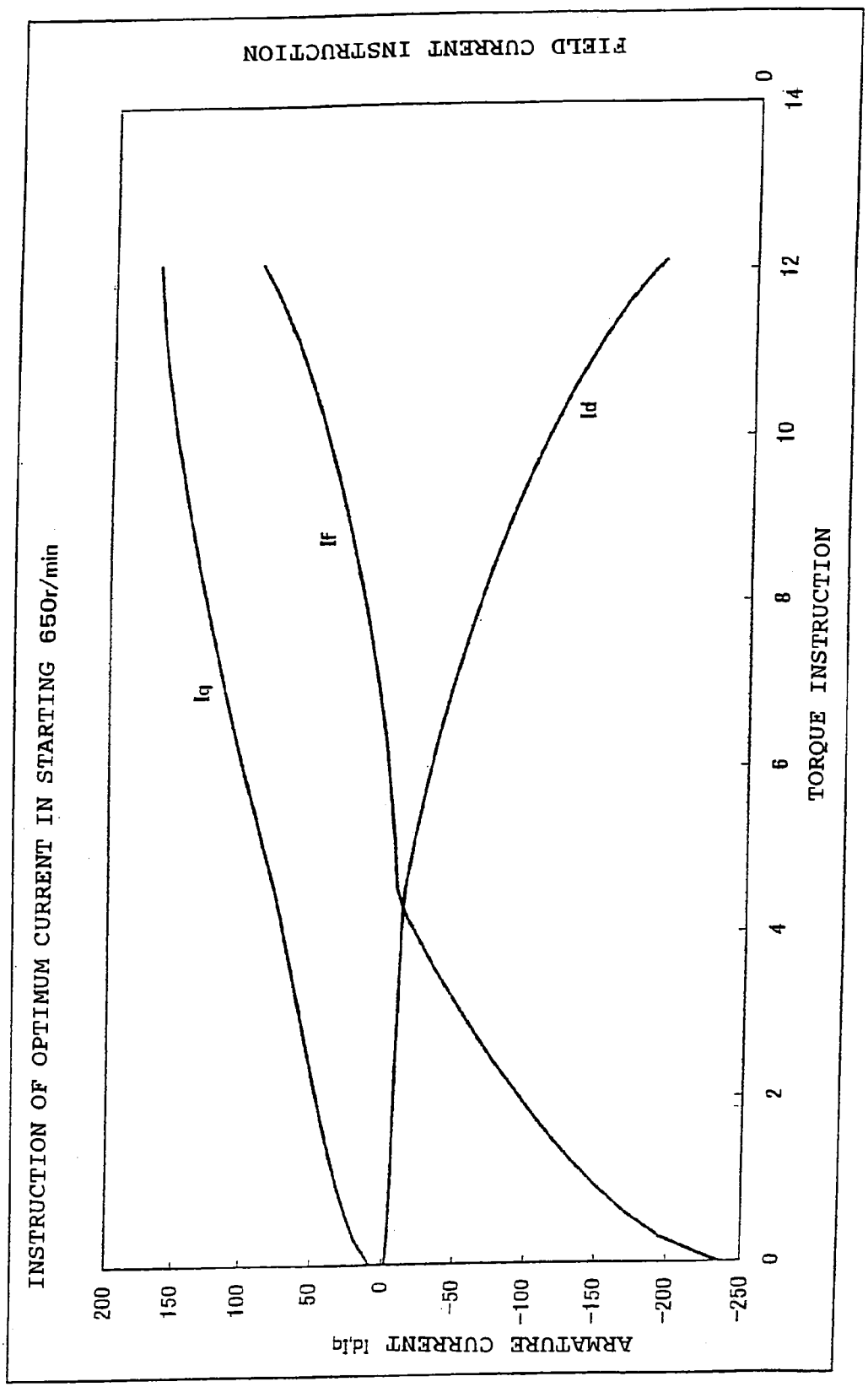
FIG. 9 is a graph showing optimum direct-axis current Id, quadrature-axis current Iq and field current If of an armature with respect to a starting torque instruction at a rotation speed of 650 r/min in the control deice for motor generator according to Embodiment 3.
Figure 10:
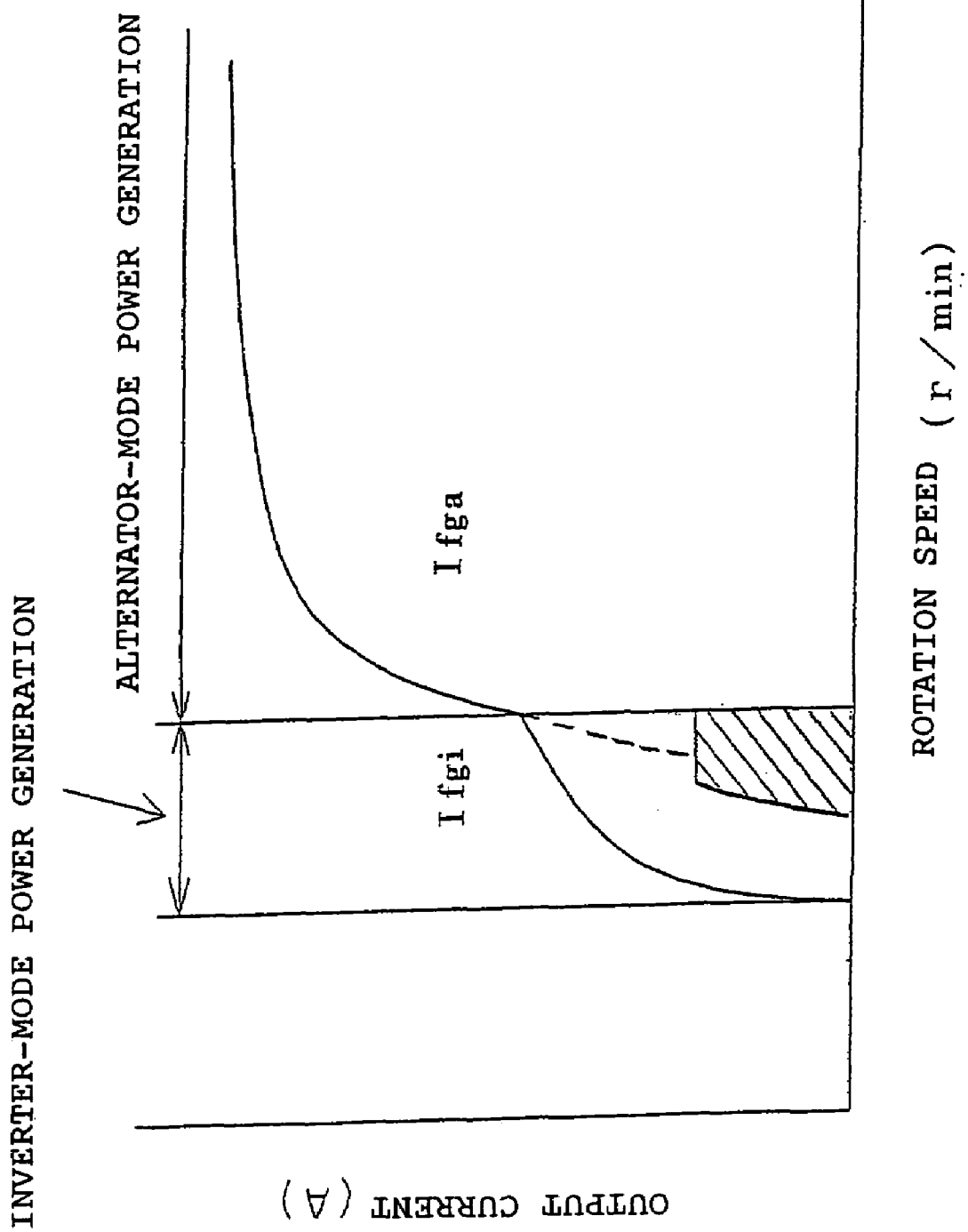
FIG. 10 is a graph showing power generation output in a control device for motor generator according to Embodiment 4.

| 1 | engine |
| 4 | field winding |
| 7 | capacitor |
| 8 | switching element |

-continued

| 9 | diode |
| 10 | control circuit |
| 11 | battery |
| 12 | rotation signal |
| 13 | field circuit |
| 14 | transistor |
| 15 | fly wheel diode |
| 16 | field current sensor |
| 17 | subtractor |
| 18 | field current limiter |
| 19 | duty control circuit |
| 20 | motor generator |
| 21 | armature winding |
| 22 | inverter unit |
| 23 | inverter module |
| 28 | field current instructing unit |
| 30 | heat sink |
| 31 | resin-molded part |
| 32 | control circuit board |
| 33 | power-supply terminal |
| 35 | lid |
| 40 | rotor |
| 41 | shaft |
| 42 | stator |
| 43 | front bracket |
| 44 | rear bracket |
| 45 | fan |
| 46 | pulley |
| 47 | brush holder |
| 49 | slip ring |

The invention claimed is:

1. A control device for motor generator characterized by comprising a motor generator having a stator with an armature winding wound thereon and a rotor of claw-pole shape with a field winding wound thereon, an inverter unit that sends and receives electric power to and from the armature winding, a field circuit that controls a field current flowing through the field winding, and a control circuit that controls the inverter unit an the field circuit, wherein an engine is started and power generation is performed while a vehicle is running, wherein a field current limit value Ifm in electric driving to start the engine is larger than a field current limit value Ifg in power generation, in the power generation, an inverter mode in a low rotation speed zone for boosting and an alternator mode in a high rotation speed zone for rectifying and outputting a generated voltage without boosting are provided, a field current limit value Ifgi in the inverter-mode power generation and a field current limit value Ifga in the alternator-mode power generation are set differently from each other, and the larger value is set as the value Ifg.

2. The control device for motor generator as claimed in claim 1, wherein in the alternator-mode power generation, the field current limit value Ifga is set to be equal to or larger than the field current limit value Ifgi, and the field current limit value Ifga in the alternator-mode power generation is set as the field current limit value Ifg in the power generation.

3. The control device for motor generator as claimed in claim 2, characterized in that the field current limit value at the time of maximum power generation in the inverter-mode power generation in a low rotation speed zone for boosting is expressed as Ifgi, and the value Ifgi is a function of rotation speed, and a speed zone is provided such that a field current Ifgip in the case where the quantity of power generation at each rotation speed is smaller than the maximum quantity of power generation at the rotation speed is smaller than Ifgi.

4. The control device for motor generator as claimed in claim 2, wherein the rotor of claw-pole shape has a field-supplementing permanent magnet.

5. The control device for motor generator as claimed in claim 1, wherein in the inverter-mode power generation, the field current limit value Ifgi is set to be equal to or larger than the field current limit value Ifga, and the field current limit value Ifgi in the inverter-mode power generation is set as the field current limit value Ifg in the power generation.

6. The control device for motor generator as claimed in claim 5, characterized in that the field current limit value at the time of maximum power generation in the inverter-mode power generation in a low rotation speed zone for boosting is expressed as Ifgi, and the value Ifgi is a function of rotation speed, and a speed zone is provided such that a field current Ifgip in the case where the quantity of power generation at each rotation speed is smaller than the maximum quantity of power generation at the rotation speed is smaller than Ifgi.

7. The control device for motor generator as claimed in claim 5, wherein the low rotation speed zone for boosting includes a zone where boosting is not carried out at the time of low load, and a field current in this case is equal to or larger than the field current limit value Ifga in the alternator-mode power generation.

8. The control device for motor generator as claimed in claim 5, wherein the rotor of claw-pole shape has a field-supplementing permanent magnet.

9. The control device for motor generator as claimed in claim 1, characterized in that the field current limit value at the time of maximum power generation in the inverter-mode power generation in a low rotation speed zone for boosting is expressed as Ifgi, and the value Ifgi is a function of rotation speed, and a speed zone is provided such that a field current Ifgip in the case where the quantity of power generation at each rotation speed is smaller than the maximum quantity of power generation at the rotation speed is smaller than Ifgi.

10. The control device for motor generator as claimed in claim 1, wherein the low rotation speed zone for boosting includes a zone where boosting is not carried out at the time of low load, and a field current in this case is equal to or larger than the field current limit value Ifga in the alternator-mode power generation.

11. The control device for motor generator as claimed in claim 1, wherein the rotor of claw-pole shape has a field-supplementing permanent magnet.

12. The control device for motor generator as claimed in claim 1, wherein the larger value of the Ifgi and Ifga values within each mode of the power generation is set as the value Ifg.

13. The control device for motor generator as claimed in claim 1, wherein, in each mode of the power generation, the value Ifgi and the value Ifga are provided, the control circuit compares the values Ifgi and Ifga to obtain a larger value of the two, and the control circuit sets the larger value of the two to the value Ifg.

* * * * *